United States Patent Office 2,974,105
Patented Mar. 7, 1961

2,974,105

SILICA ORGANOSOLS AND THEIR PREPARATION

Ralph K. Iler, Brandywine Hundred, Del., assignor to E. I. du Pont de Nemours and Company, Wilmington, Del., a corporation of Delaware No Drawing. Filed May 1, 1956, Ser. No. 581,843

18 Claims. (Cl. 252—309)

This invention relates to organosols of silica spheroids in alkoxy-substituted ethanols, and to processes for producing such sols. More particularly, the invention is directed to stable organosols of amorphous, dense, substantially non-aggregated silica spheroids 5 to 130 millimicrons in diameter, which preferably are surface-esterified with alkoxy-substituted ethanols and are hydrophilic, the degree of esterification being from 1.0 to 3.2 ester groups per square millimicron of silica surface, said spheroids being dispersed in alkoxy-substituted ethanols completely miscible with water, the organosols having a silica content of 26 to 60 percent, having a relative viscosity, as measured at 5% $SiO_2$, below 1.5, and preferably being stabilized with enough of an alkali of the class consisting of water-soluble monovalent metal silicates and basic hydroxides of monovalent cations to give an $SiO_2:M_2O$ mol ratio greater than 20D:1, where D is the average particle diameter in millimicrons and $M_2O$ is the alkali expressed as the equivalent basic oxide, and is further directed to processes comprising subjecting an aquasol of amorphous, dense, substantially non-aggregated silica spheroids 5 to 130 millimicrons in diameter to contact with an anion- and a cation-exchanger until the sol is completely deionized, adding an alkali of the above-mentioned class until the $SiO_2:M_2O$ ratio is greater than 20D:1 and preferably in the range of 300D:1 to 50D:1, mixing the so-treated aquasol with at least three times its volume of an alkoxy-substituted ethanol completely miscible with water to make an aqua-organosol and distilling water from said aqua-organosol, whereby novel organosols of silica spheroids are produced, and preferably continuing to remove water from the mixture until the water content is below about 0.1 percent and heating the mixture, whereby concentrated, stable organosols of silica spheroids surface-esterified to the extent of from 1.0 to 3.2 ester groups per square millimicron of silica surface, dispersed in the substituted ethanol, are produced.

This application is a continuation-in-part of my copending application Serial No. 288,233, filed May 16, 1952, for Product and Process, now United States Patent 2,801,185.

In the above-mentioned parent application it is disclosed that colloidal silica particles can be surface-esterified with alcohols, including alkoxy-substituted alcohols. The present application is concerned with processes and products involving, broadly, the esterification processes of the parent application, but under special conditions that give products which have unexpected and unusual properties—for instance, products that are hydrophilic rather than hydrophobic and are dispersible in dilute aqueous alkaline solutions.

Silica, in the form of discrete particles 5 to 130 millimicrons in diameter, has a variety of uses. A number of processes have recently become known for producing aquasols of silica particles in this size range. However such sols contain, at the very most, 50% of silica, and if the water representing the other 50% of the sol is evaporated off the sol gels irreversibly—that is, the silica particles form strong aggregates which cannot readily be redispersed in liquid media to again form sols, and similarly, cannot be dispersed in media in which the silica particles have utility. Furthermore, there are organic systems in which the silica possesses utility but with which an aqueous carrier for the particles is incompatible. For use in such systems there is a need for stable silica sols of 5 to 130 millimicron particles dispersed in an organic liquid.

The present invention presents an answer to the problem of providing 5 to 130 millimicron silica spheroids in the form of organosols. Certain of the products are readily compatible with dilute, aqueous alkaline solutions to form aqua-organosols which are concentrated enough to be used industrially. The preferred products—that is, the organosol products, are concentrated enough to be shipped and used in industry on an economical basis, are stable enough to use after extended periods of storage, and are compatible in organic systems where aquasols are incompatible.

Now according to the present invention it has been found that silica compositions having the properties above-described can be produced by subjecting an aquasol of amorphous, dense, substantially non-aggregated silica spheroids 5 to 130 millimicrons in diameter to contact with an anion-exchanger in the hydroxyl form and a cation-exchanger in the hydrogen form until the sol is completely deionized, adding an alkali of the class consisting of water-soluble monovalent metal silicates and basic hydroxides of monovalent cations until the $SiO_2:M_2O$ and ratio is greater than 20D:1, where D is the average particle diameter in millimicrons and $M_2O$ is the alkali expressed as the equivalent basic oxide, mixing the so-treated aquasol with at least three times its volume of an alkoxy-substituted ethanol completely miscible with water to make an aqua-organosol, and distilling water from said aqua-organosol. The novel silica organosols which are produced are stable, contain amorphous, dense, substantially non-aggregated silica spheroids 5 to 130 millimicrons in diameter dispersed in an alkoxy-substituted ethanol completely miscible with water, have a silica content of 26 to 60%, have a relative viscosity, as measured at 5% $SiO_2$, in the range of 1.1 to 1.5, and have an $SiO_2:M_2O$ mol ratio greater than 20D:1. It has further been found according to this invention that by further evaporation of water from the organosols until the water content is below about 0.1% and by heating the mixture, the silica spheroids are surface-esterified to the extent of from 1.0 to 3.2 ester groups per square millimicron of silica surface.

The art is already familiar with various methods for making silica aquasols containing particles in the range of 5 to 130 millimicrons and any of these methods can be used for making the starting material for a process of this invention. It is noted that methods in which steps are not taken to grow the size of the silica particles up to 5 millimicrons do not give sols of the type required and are to be avoided. Sols of particles near the lower end of the desired size range can be prepared by subjecting a dilute sodium silicate solution to contact with a cation-exchange resin to obtain an effluent containing about 3% $SiO_2$ and evaporating water from this sol to a silica concentration of about 6 percent. Sols in which the ultimate particles have been increased in size can be made by processes of Trail U.S. Patent 2,573,743, wherein a solution of ionic silica is added to a silica sol, the mixture is heated, and cations are removed by ion-exchange. Particularly preferred are sols prepared according to Bechtold and Snyder U.S. Patent 2,574,902 in which a heel of silica sol is prepared and additional quantities of silica sol containing active silica are added in such a manner that the silica added builds up on the silica particles already present. Processes of Broge U.S. Patent 2,680,721 can also be used.

Although the size of the non-aggregated, dense silica particles in the silica aquasol can be in the range from 5 to 130 millimicrons in diameter, in particularly preferred compositions the size range is from 10 to 50 millimicrons. This size range refers to the discrete, ultimate particles and can be ascertained either by direct examination of the sol under an electron microscope or by calculation from nitrogen adsorption measurements according to techniques with which the art is already familiar.

The particles in the silica aquasol should be substantially discrete—that is, non-aggregated. The freedom from aggregation can be shown by relative viscosity measurements. Thus the sol, at a concentration of 10% $SiO_2$ and in a completely deionized condition, should have a relative viscosity range from 1.15 to 1.80, preferably in the range of from 1.15 to 1.40.

The silica aquasols for use in the present invention preferably should contain at least 10% silica expressed as $SiO_2$. The silica content preferably is in the range from 10 to 50%, 25 to 40% $SiO_2$ being particularly preferred. However, when operating with the smaller silica particles, namely those in the lower size ranges from, say, 5 to 15 millimicrons, the preferable range is slightly more dilute—namely, in the range from 15 to 25% $SiO_2$.

Having selected a suitable silica aquasol as above described, the sol is subjected to contact with an anion- and a cation-exchange resin until completely deionized. The art is already familiar with techniques for effecting such deionization, the methods described in the above-mentioned Rule Patent 2,577,485 being suitable. As the anion-exchange resin one can use, for example, "Amberlite" IR4B in the hydroxyl form, and as the cation-exchange resin one can use for example "Nalcite" HCR in the hydrogen form. "Amberlite" IR 4B is a modified phenol-formaldehyde-sulfonic acid-type resin, and "Nalcite" HCR is a nuclear sulfonated polymer of styrene containing divinyl benzene. The silica sol can be passed downwardly through a column of the mixed resins, or alternatively the sol can first be treated with a cation-exchange resin in the hydrogen form and then with an anion-exchange resin in the hydroxyl form. The exchange cycle can be repeated two or more times if desired. Another alternative is to stir the aquasol with a mixture of the anion- and cation-exchange resins. The extent of deionization can be determined by conductivity. The salt content, expressed as percent $Na_2SO_4$ and measured by conductivity, should be less than 0.2 mol percent, based on the $SiO_2$.

After the silica aquasol has been completely deionized as above described it will be substantially free of salts. The specific conductivity of the sol should not exceed about $4 \times 10^{-4}$ mho/cm. Preferably the conductivity will not exceed about $1 \times 10^{-4}$ mho/cm. and if the sol is to be very highly concentrated the specific conductivity should be not more than about $6 \times 10^{-6}$ mho/cm. In this highly deionized condition the sol is in a metastable state; hence it is desirable to proceed immediately with the preparation of the organosol.

Ratio adjustment, if desired, is accomplished by adding a suitable quantity of an alkali. This alkali is selected from the class consisting of water-soluble monovalent metal silicates and basic hydroxides of monovalent ions. Examples of suitable silicates are lithium, sodium, and potassium silicates. Examples of basic hydroxides of monovalent anions are lithium, sodium, and potassium hydroxides, substituted ammonium hydroxides such as tetramethyl ammonium hydroxide, and ammonium hydroxide. It will be understood that substances such as amines and alkali metal oxides and carbonates, which react with water to give basic hydroxide, are the full equivalents of the alkalies just mentioned. Alkali metal carbonates can be used if the carbonate can be eliminated as $CO_2$.

The amount of alkali added to the silica sol should be enough to adjust the $SiO_2:M_2O$ mol ratio to a value greater than 20D:1 and preferably from 300D:1 to 50D:1 where D is the silica particle size in millimicrons and M is a monovalent alkali metal, ammonium, or substituted ammonium cation. It will be understood that the value "$M_2O$" is merely a convenient expression for stating the molar equivalency of various alkalies and that any base can be expressed in this manner whether or not it exists as the metal oxide. Thus if the alkali is, for example, sodium hydroxide, $M_2O$ represents $Na_2O$. On the other hand if the alkali is ammonium hydroxide, $M_2O$ represents the equivalent of $(NH_4)_2O$.

While the $SiO_2:M_2O$ ratio is always greater than 20D:1 as above-indicated, the amount of alkali which it is preferred to use in the process depends to some extent on the organic liquid which is to be used as the continuous phase of the organosol. As the number of carbon atoms in the alkoxy-substituted ethanol increases, the amount of alkali which can advantageously be used in the alkalization process corespondingly decreases. With 2-methoxyethanol the ratio can be within the broad range indicated; however, with higher molecular weight alcohols such as 2-ethoxyethanol, 2-ethoxy-2-ethoxyethanol or 2-butoxyethanol, the amount of alkali used should be less—that is, the $SiO_2:M_2O$ ratio should be nearer the upper limit of the range from 300D:1 to 50D:1.

The silica aquasol, with suitably adjusted ratio, is mixed with a water-miscible, alkoxy-substituted ethanol. Typical of such alcohols, and especially preferred, in addition to those already mentioned are 2-propoxyethanol, propylene glycol ethyl ether, and in general the "Cellosolve" and "Carbitol" solvents which are monofunctional alcohols. The alcohols having a boiling point below 250° C. are preferred, and specifically preferred are 2-methoxyethanol and 2-ethoxyethanol. It will be noted that in the especially preferred alcohols the alkoxy-substitution is on the beta carbon of the ethanol.

The proportion of alcohol to aquasol should be at least 3 to 1 by volume. Larger amounts of alcohol can be added but no advantage is gained and the sol becomes unduly diluted.

After mixing the aquasol and the alcohol, water is removed by distillation. This distillation can be carried out at atmospheric pressure, but in some instances it is advantageous to employ reduced pressure.

Distillation can be carried out in a distilling column having, for example, from 3 to 30 theoretical plate equivalents. During distillation, the system should be agitated, and in the optimum case, the heating surfaces provided should have a temperature only slightly in excess of that of the distilling medium—say, a difference of from 10 to 30° C. This is to avoid drying of the organosol on the walls of the equipment. Preferably the distillation is carried out in the absence of oxygen—that is, in an inert atmosphere as for example in nitrogen. Acid gases such as carbon dioxide are not inert and should be avoided since they neutralize the alkali in the product. The inert atmosphere is desirable because the alcohols used are subject to oxidation by oxygen in the atmosphere, resulting in discoloration.

In one method of carrying out this distillation a heel of the alcohol is placed in the distilling apparatus, and the mixed organo-aquasol is slowly fed into this heel. During the distillation the water content in the distilling solution should be maintained at less than 10%, preferably less than 2% and specifically less than 0.5%. Low water content favors the preparation of lower relative viscosity organosol products.

In another method, the distillation is carried out merely by evaporating off alkoxy-substituted ethanol and water from a body of the aqua-organosol. Additional alkoxy-substituted ethanol can be added during the evaporation if it is necessary and desirable to remove substantially all of the water. This process can be carried out at reduced pressure or under vacuum.

With either method for concentrating the organosol, evaporation is continued until the silica content of the organosol is from 26 to 60% $SiO_2$ by weight.

It is preferred that the deionized aquasol and the aqua-organosol feed be used as rapidly as possible in the further steps of the process. In a preferred aspect of the invention these materials are used almost immediately after preparation and are not aged longer than 6 hours.

By the distillation the water content in the organosol is substantially reduced, preferably to less than 10%. In a preferred aspect, the water content is reduced below 0.2% and in a further preferred aspect is substantially 0. Water content is determined by titration with Fisher reagent according to the well-known method.

If the distillation is carried on at a sufficiently high temperature and the water content is brought down to a very low level, esterification is effected of surface silanol groups—that is, SiOH groups on the surface of the silica. Ester groups, SiOR, are formed on the surface of the particles. Sols having a low degree of esterification, such as 0 to 1.0 ester groups per square millimicron of particle surface can be prepared by distilling out only a part of the water. Alternatively such sols can be separated by distilling out water at a lower temperature—say in the region below 100° C., by using low pressures or partial vacuum during the distillation procedure. On the other hand, by lowering the water content to the range of 0 to 0.2% and refluxing at temperatures above 100° C., for instance for fifteen minutes to one hour at a temperature of 200° C., a higher degree of esterification, in the range from 1 to 4 ester groups per square millimicron of particle surface, is obtained. This is a preferred practice when high degrees of esterification are desired. For such degrees of esterification at lower temperatures, longer times should be used and in general when the temperature is decreased by 10° the time should be increased by a factor of two.

The silica organosol products of the invention contain from 26 to 60% by weight of silica as $SiO_2$, the preferred sols containing from 30 to 50% $SiO_2$. They are alkali-stabilized and have $SiO_2:M_2O$ ratios greater than 20D:1 and preferably of from 300D:1 to 20D:1, D being the average particle diameter in millimicrons. Specifically a ratio of from 300D:1 to 50D:1 is especially preferred. When adjusted to a silica content of 5% with the alkoxy-substituted ethanol constituting the liquid phase of the sol, they have a relative viscosity in the range of 1.1 to 1.5 and preferably in the range of 1.1 to 1.4. The organosols are stable in that they show substantially no increase in relative viscosity when stored at 30° C. for one month. Sols prepared with ratios of $SiO_2:M_2O$ greater than 300D:1 have remarkable stability at higher temperatures in that they show very little increase in relative viscosity on storage for one day at 100° C.

The organosols may contain some water—say up to 10% by weight, but in the preferred compositions the water content is less than 1% and in the most preferred case is from 0 to 0.1%.

For sols of maximum stability the concentration of silica in the organosol is controlled with reference to particle size. Thus, the larger the particles, the more concentrated the sols can be with good stability. Sols in which the particles are 100 millimicrons in diameter can be concentrated to 60% $SiO_2$ with good stability. Sols containing particles in the size range of 20 millimicrons can be concentrated to 50% $SiO_2$ whereas sols containing 5 to 10 millimicron particles will ordinarily be less stable above about 40% $SiO_2$. The concentration of silica in organosols can be readily determined by evaporating the organosol to dryness and igniting the residue to constant weight in air at a temperature of about 1000° C. The residue is weighed, fumed with sulfuric and hydrofluoric acids, reignited and reweighed, and the loss in weight is calculated as silica. Particularly preferred sols of this invention contain from 30 to 50% silica by weight in alkoxy-substituted ethanol as determined by this technique.

The relative viscosity of the organosol, which as above indicated is an important characteristic, can be measured by diluting the sol to 5% $SiO_2$ with the alkoxy-substituted alcohol contained therein. Using an Ostwald pipette, the drain time of the solvent and of the 5% silica sol is measured at 30° C. Relative viscosity, $N_r$, is then calculated from the expression:

$$N_r = \frac{dt}{d_g t_g}$$

where $d$ and $t$ are the density and drain time of the silica organosol and $d_g$ and $t_g$ are the density and drain time of the solvent, respectively.

Relative viscosity, as just described, is a prima facie indication of stability, since if the relative viscosity undergoes substantially no increase when the organosols are aged for one month at 30° C. or for 24 hours at 190° C. the sols are considered to be stable. Actually the preferred sols of this invention show a slight decrease in viscosity during such aging, the decrease being up to about 10% less than that of the original relative viscosity. Broadly, organosols which show a viscosity change of ±10% of the original viscosity after storage under these conditions are considered to be stable.

The preferred silica organosols are alkali-stabilized as already described. Preferably an alkali selected from the group consisting of sodium hydroxide, lithium hydroxide, and potassium hydroxide is used. The actual $SiO_2:M_2O$ ratio is related to the particle diameter as already indicated. As an example of a preferred case, an organosol containing silica particles in the range of 20 millimicrons is stable at $SiO_2:Na_2O$ ratios in the range from 400:1 to 6000:1. An organosol containing 5 millimicron particles requires somewhat more alkali, the preferred $SiO_2:Na_2O$ ratio being in the range of from 100:1 to 1500:1. The organosols have a pH in the range from 6.0 to 9.0 and preferably from 6.5 to 8.5. When measuring pH, the sol is diluted to 20% $SiO_2$ with the alkoxy-substituted ethanol and then with an equal volume of water. The mixture is stirred and the pH is measured, using a standard Beckman Model B pH meter, after equilibrium has been established. The alkali content of the organosols can also be determined by diluting one part of the organosol with 10 parts of water and titrating the resulting aquaorganosol to pH 4, using standard acid. From this titer and the silica content of the original organosol, the $SiO_2:M_2O$ ratio is calculated.

The preferred organosols of this invention are colorless or very light yellow. The percent light transmission of silica organosols having particles below 25 millimicrons in size can be determined with a Beckman model Du spectrophotometer and a wave length of 400 millimicrons, using the alkoxy-substituted ethanol as the reference. The organosols have a percent transmission in the range of from 80 to 100%. In measuring the percent transmission of organosols containing particles larger than 25 millimicrons, compensation is made for the percent transmission of the particles in the organosol. In this case, a synthetic reference can be prepared by mixing a silica aquasol (having a particle size in the same range as the organosol) with alkoxy-substituted ethanol in such proportions that the aqua-organosol contains 10% $SiO_2$ and equal quantities of alkoxy-substituted ethanol and water. The percent transmission of the organosol is then determined by diluting the organosol with the organic solvent to 20% $SiO_2$ and adding an equal volume of water.

The size of the silica particles in the organosol can be determined directly by electron micrographs. On an electron micrograph print made at 50,000 magnification all of the particles in a given area are counted until about 300 to 400 particles have been measured. The particle size is then the number average of these measured particles. Alternatively particle size can be determined from surface area measurements. The organosol is dried in a vacuum at 110° C. until all of the organic solvent is removed. The surface area of the resulting powder is then determined by nitrogen adsorption. The particle diameter, in microns, is then calculated from the surface area, using the relationship:

$$D = \frac{3000}{A_n}$$

where D is the particle diameter in millimicrons, and $A_n$ is the surface area of the product in square meters per gram. Products of this invention contain silica particles in the size range of 5 to 130 millimicrons, and preferably in the range of 10 to 50 millimicrons, with 15 to 25 millimicrons being the most preferred range.

The degree of esterification of the silica particles in the organosol can be determined from the dry powder used in measuring the nitrogen surface area as above described. The carbon content of the powder is determined by igniting the sample, collecting and weighing the resulting carbon dioxide. From the carbon content and the surface area in square meters per gram one can calculate the degree of esterification according to the equation:

$$D.E. = \frac{500\% \text{ C}}{n \times A_n}$$

where D.E. is the degree of esterification in ester groups per square millimicron, % C is the percent carbon, $n$ is the number of carbon atoms in the alkoxy-substituted ethanol of the organosol and $A_n$ is the surface area, in square meters per gram, of the silica powder derived from the organosol.

Methyl red dye adsorption can also be used as an indication of the degree of surface-esterification of the dried silica particles. Such a method is fully described in Iler United States Patent 2,657,149, issued October 27, 1953.

The organosols of this invention are useful for increasing the soil-resistance of such materials as carpets, upholstery fabrics, wallpaper and painted surfaces, and the like. The products can also be used to advantage as fillers in organic polymers, particularly of the polyester type.

The invention will be better understood by reference to the following illustrative examples:

*Example 1*

A silica aquasol (containing 17 millimicron particles which were discrete, spherical, amorphous silica, the aquasol containing 30% $SiO_2$ and being stabilized by sodium hydroxide) was completely deionized using a mixture of "Nalcite" HCR cation exchange resin in the hydrogen form and "Amberlite" IR4B anion exchange resin in the hydroxyl form. An excess of resin was used and the sol obtained was completely free of foreign ions. The $SiO_2:Na_2O$ ratio of the deionized sol was adjusted to 1500:1 by adding 1 N sodium hydroxide with vigorous agitation.

To 100 ml. of this sol was added 100 ml. of 2-ethoxyethanol. The pH of this mixture was 7.1. A heel of 500 ml. of ethoxyethanol was placed in a distillation flask equipped with a distilling column having an equivalent of 3 theoretical plates, and, after bringing the organic solvent to the boiling point, the aqua-organosol was added dropwise, while removing the water and ethoxyethanol by distillation. When the water content in the flask was reduced to 0.05%, the sol was concentrated by direct boil-down to 45% $SiO_2$. The product was a stable organosol. The relative viscosity of this organosol when diluted to 5% $SiO_2$ was 1.18 and hence the particles therein were substantially non-aggregated.

The organosol was dried in a vacuum oven at 100° C. to a dry powder. This powder had a surface area, as determined by nitrogen adsorption, of 186 m.²/g., by dye adsorption, of 4.0 m.²/g., and contained 3.06% carbon, corresponding to a degree of esterification of 2.10. When 1 gram of the powder was added to 20 ml. of water containing sufficient sodium hydroxide to give an $SiO_2:Na_2O$ ratio of 50, the powder completely dispersed to form a silica aquasol.

*Example 2*

The process of this example was similar to that of Example 1, except that the solvent used was 2-butoxyethanol, the aquasol after deionization being alkalized to an $SiO_2:Na_2O$ ratio of 3500:1. The resulting product after distillation was concentrated to 25% silica, and contained 0.15% water after such concentration.

*Example 3*

A silica aquasol was deionized and diluted to 20% $SiO_2$. This aquasol contained 15 millimicron silica particles and had a relative viscosity of 1.4. After deionization, the sol was treated with 1 N sodium hydroxide, until the $SiO_2:Na_2O$ ratio was 1000, then 1.5 volumes of 2-methoxyethanol was added for each volume of aquasol, and the water was removed by feeding this organo-aquasol into a heel of 3 volumes or refluxing 2-methoxyethanol. The product was finally concentrated to a stable 35% $SiO_2$ organosol by direct boil-down. When diluted to 5% $SiO_2$ with 2-methoxyethanol, it had a relative viscosity of 1.15.

*Example 4*

A silica aquasol (containing spherical particles about 17 millimicrons in diameter and consisting of amorphous silica, the aquasol containing 30% $SiO_2$ and being stabilized with sodium hydroxide) was completely deionized by first adding "Dowex 50-X-8" cation exchange resin in the hydrogen form and then adding "Amberlite IR-45" anion exchange resin in the hydroxyl form. An excess of resin was used and the sol obtained was free of foreign ions.

To 2 parts by volume of this aquasol was added 2 parts by volume of 2-ethoxyethanol. The pH of this mixture, as measured using a Beckman Model G pH meter, was 3.22. A heel of 10 parts by volume of 2-ethoxyethanol was placed in a distillation flask equipped with an agitator and a distilling column having the equivalent of three theoretical plates. After bringing the 2-ethoxyethanol heel to the boiling point, the aqua-organosol was added dropwise at such a rate as to maintain the temperature in the pot at greater than 129° C. During the course of the distillation, 3.6 parts by volume of ethoxyethanol was added to the pot to maintain constant volume. When the temperature at the top of the distilling column reached 134.5° C., indicating total dehydration, the sol was further concentrated, by vacuum distillation, to 30.7% $SiO_2$. The product was a stable organosol. The relative viscosity of this organosol when diluted to 5% $SiO_2$ was 1.19.

A sample of the organosol was dried in a vacuum oven at 100° C. to a dry powder. This powder had a surface area, as determined by nitrogen adsorption of 176 square meters per gram and contained 3.06% carbon, corresponding to a degree of esterification of 2.18.

*Example 5*

A completely deionized silica aquasol was prepared as described in Example 4. To 1 part by weight of this sol was added 3.7 parts by weight of 2-ethoxyethanol. The resulting aqua-organosol was charged to a distilling apparatus fitted with an agitator and a distilling column having an equivalent of three theoretical plates. The water was then removed by azeotropic distillation, and when the sol was anhydrous, it was further concentrated by vacuum distillation. The final sol concentration was 31.6% $SiO_2$. The product was a stable organosol having a relative viscosity as measured at 5% $SiO_2$ of 1.18.

A sample of the organosol was dried in a vacuum oven at 100° C. to a dry powder. This powder had a surface area, as measured by nitrogen adsorption, of 197 square meters per gram and contained 2% carbon, corresponding to a degree of esterification of 1.27.

*Exampl 6*

A silica aquasol as described in Example 4, was completely deionized. The $SiO_2:Na_2O$ mol ratio was then adjusted to 700:1 by adding 1.03 N sodium hydroxide to the aquasol with vigorous agitation.

To 1 part by weight of this aquasol was added 3.7 parts by weight of 2-ethoxyethanol. This aquaorganosol was charged to a distillation apparatus and water was removed by azeotropic distillation. When the sol was anhydrous, it was further concentrated by vacuum distillation. The product was a stable organosol containing 43.5% $SiO_2$. The relative viscosity of this sol, when diluted to 5% $SiO_2$, was 1.23.

A sample of the organosol was dried in a vacuum even at 100° C. to a dry powder. This powder had a surface area, as measured by nitrogen adsorption, of 170 square meters per gram and contained 3.79% carbon. This corresponds to a degree of esterification of 2.80.

*Example 7*

A silica aquasol (containing 7-millimicron-diameter, spherical particles consisting of amorphous silica, the aquasol containing 17.3% by weight of silica and being stabilized by sodium hydroxide) is completely deionized using a mixture of "Nalcite" HCR cation exchange resin in the hydrogen form and "Amberlite" IR4B anion exchange resin in the hydroxyl form. An excess of resin is used and the sol obtained is completely free of foreign ions. The $SiO_2:K_2O$ ratio of the deionized sol is adjusted to 500:1 by adding 1 N potassium hydroxide with vigorous agitation.

To one part by weight of this sol is added four parts by weight of 2-ethoxyethanol. The resulting aquaorganosol is charged to a distilling apparatus fitted with an agitator and a distilling column. The water is then removed by azeotropic distillation, and when the sol is anhydrous it is further concentrated by vacuum distillation to a silica concentration of 28% by weight. The product is a stable organosol having a relative viscosity as measured at 5% $SiO_2$ of 1.28. A sample of the organosol is dried in vacuum at 100° C. to give a dry powder for analysis. This has a surface area of 395 square meters per gram, as determined by nitrogen absorption, and a degree of esterification of 1.90.

*Example 8*

Starting with a silica aquasol containing 45-millimicron-diameter particles, consisting of amorphous silica and having a silica concentration of 30% by weight, the procedure described in Example 7 is carried out, with the modification that after deionization the $SiO_2:Na_2O$ ratio is adjusted to 5000:1, by adding 1 N sodium hydroxide. A stable 2-ethoxyethanol sol is obtained, having a silica concentration of 35% by weight and a relative viscosity as measured at 5% $SiO_2$ of 1.17. A sample of this organosol is dried in vacuum at 100° C. to give a dry powder for analysis. This powder has a surface area of 60 square meters per gram, as determined by nitrogen adsorption, and a degree of sterification of 3.00.

*Example 9*

Starting with a silica aquasol containing particles of average diameter 100 millimicrons, consisting of amorphous silica and having a silica concentration of 24.9% by weight, the procedure described in Example 7 is carried out, with the modification that after deionization the $SiO_2:Na_2O$ ratio is adjusted to 12000:1 by adding 1 N sodium hydroxide. A stable organosol is obtained having a silica concentration of 50% by weight and a relative viscosity, as measured at 5% $SiO_2$, of 1.12. A sample of this organosol is dried in vacuum at 100° C. to give a dry powder for analysis. This powder has a surface area of 30 square meters per gram, as determined by nitrogen adsorption, and a degree of esterification of 3.00.

I claim:

1. A silica organosol characterized by showing substantially no increase in relative viscosity when stored at 30° C. for one month, the organosol comprising amorphous, dense, substantially non-aggregated silica spheroids 5 to 130 millimicrons in diameter dispersed in a continuous liquid phase consisting essentially of a water-miscible, alkoxy-substituted ethanol, the organosol having a silica content of 26 to 60% $SiO_2$, a pH of 6 to 9, and a salt content as measured by conductivity and expressed as $Na_2SO_4$ of less than 0.2 mol percent based on the silica, and having a relative viscosity, as measured at 5% $SiO_2$ of from 1.1 to 1.5.

2. A silica organosol characterized by showing substantially no increase in relative viscosity when stored at 30° C. for one month, the organosol comprising amorphous, dense, substantially non-aggregated silica spheroids 5 to 130 millimicrons in diameter dispersed in a continuous liquid phase consisting essentially of a water-miscible, alkoxy-substituted ethanol, the organosol having a silica content of 26 to 60% $SiO_2$ and a salt content as measured by conductivity and expressed as $Na_2SO_4$ or less than 0.2 mol percent based on the silica, having a relative viscosity, as measured at 5% $SiO_2$, of from 1.1 to 1.5, and containing enough of an alkali of the class consisting of water-soluble monovalent metal silicates and basic hydroxides of monovalent cations to give an $SiO_2:M_2O$ mol ratio of from 20D:1 to 300D:1, where D is the average particle diameter in millimicrons and $M_2O$ is the alkali expressed as the equivalent basic oxide.

3. A silica organosol characterized by showing substantially no increase in relative viscosity when stored at 30° C. for one month, the organosol comprising amorphous, dense, substantially non-aggregated silica spheroids 10 to 50 millimicrons diameter dispersed in a continuous liquid phase consisting essentially of a water-miscible, alkoxy-substituted ethanol, the organosol having a silica content of 26 to 60% $SiO_2$, a pH of 6 to 9, and a salt content as measured by conductivity and expressed as $Na_2SO_4$ of less than 0.2 mol percent based on the silica, and having a relative viscosity, as measured at 5% $SiO_2$, of from 1.1 to 1.5.

4. A silica organosol characterized by showing substantially no increase in relative viscosity when stored at 30° C. for one month, the organosol comprising amorphous, dense, substantially non-aggregated spheroids 10 to 50 millimicrons in diameter dispersed in a continuous liquid phase consisting essentially of a water-miscible, alkoxy-substituted ethanol, the organosol having a silica content of 26 to 60% $SiO_2$, and a salt content as measured by conductivity and expressed as $Na_2SO_4$ of less than 0.2 mol percent based on the silica, having a relative viscosity, as measured at 5% $SiO_2$, of from 1.1 to 1.5, and containing enough of an alkali of the class consisting of water-soluble monovalent metal silicates and basic hydroxides of monovalent cations to give an $SiO_2:M_2O$ mol ratio from 300D:1 to 20D:1, where D is the average particle diameter in millimicrons and $M_2O$ is the alkali expressed as the equivalent basic oxide.

5. A silica organosol characterized by showing substantially no increase in relative viscosity when stored at 30° C. for one month, the organosol comprising amorphous, dense, substantially non-aggregated silica spheroids 5 to 130 millimicrons in diameter dispersed in a continuous liquid phase consisting essentially of a water-miscible, alkoxy-substituted ethanol, the organosol having a silica content of 26 to 60% $SiO_2$, and a salt content as measured by conductivity and expressed as $Na_2SO_4$ of less than 0.2 mol percent based on the silica, having a relative viscosity, as measured at 5% $SiO_2$, of from 1.1 to 1.5, and containing enough of an alkali of the class consisting of water-soluble monovalent metal silicates and basic hydroxides of monovalent cations to give an $SiO_2:M_2O$ mol ratio of from 300D:1 to 50D:1, where D is the average particle diameter in millimicrons and $M_2O$ is the alkali expressed as the equivalent basic oxide.

6. A silica organosol characterized by showing substantially no increase in relative viscosity when stored at 30° C. for one month, the organosol comprising amorphous, dense, substantially non-aggregated silica spheroids 10 to 50 millimicrons in diameter dispersed in a continuous liquid phase consisting essentially of ethoxy ethanol, the organosol having a silica content of 26 to 60% $SiO_2$, and a salt content as measured by conductivity and expressed as $Na_2SO_4$ of less than 0.2 mol percent based on the silica, having a relative viscosity, as measured at 5% $SiO_2$, of from 1.1 to 1.5, and being stabilized with enough sodium hydroxide to give an $SiO_2:Na_2O$ mol ratio of from 300D:1 to 50D:1, where D is the average particle diameter in millimicrons.

7. A silica organosol characterized by showing substantially no increase in relative viscosity when stored at 30° C. for one month, the organosol comprising amorphous, dense, substantially non-aggregated silica spheroids 5 to 130 millimicrons in diameter surface-esterified with an alkoxy-substituted ethanol, there being from 1.0 to 3.2 ester groups per square millimicron of silica surface, said spheroids being dispersed in a continuous liquid phase consisting essentially of a water-miscible, alkoxy-substituted ethanol, the organosol having a silica content of 26 to 60% $SiO_2$, and a salt content as measured by conductivity and expressed as $Na_2SO_4$ of less than 0.2 mol percent based on the silica, having a relative viscosity, as measured at 5% $SiO_2$, of from 1.1 to 1.5, and containing enough of an alkali of the class consisting of water-soluble monovalent metal silicates and basic hydroxides of monovalent cations to give an $SiO_2:M_2O$ mol ratio of from 20D:1, to 300D:1 where D is the average particle diameter in millimicrons and $M_2O$ is the alkali expressed as the equivalent basic oxide.

8. A silica organosol characterized by showing substantially no increase in relative viscosity when stored at 30° C. for one month, the organosol comprising amorphous, dense, substantially non-aggregated silica spheroids 10 to 50 millimicrons in diameter surface-esterified with ethoxy ethanol, there being from 1.5 to 3.2 ester groups per square millimicron of silica surface, said spheroids being dispersed in a continuous liquid phase consisting essentially of ethoxy ethanol, the organosol having a silica content of 30 to 50% $SiO_2$, and a salt content as measured by conductivity and expressed as $Na_2SO_4$ of less than 0.2 mol percent based on the silica, having a relative viscosity, as measured at 5% $SiO_2$, of from 1.1 to 1.5, and being stabilized with enough sodium hydroxide to give an $SiO_2:Na_2O$ mol ratio of from 300D:1 to 50D:1, where D is the average particle diameter in millimicrons.

9. A silica organosol characterized by showing substantially no increase in relative viscosity when stored at 30° C. for one month, the organosol comprising amorphous, dense, substantially non-aggregated silica spheroids 10 to 50 millimicrons in diameter surface-esterified with ethoxy ethanol, there being from 1.0 to 1.5 ester groups per square millimicron of silica surface, said spheroids being dispersed in a continuous liquid phase consisting essentially of ethoxy ethanol, the organosol having a silica content of 30 to 50% $SiO_2$, and a salt content as measured by conductivity and expressed as $Na_2SO_4$ of less than 0.2 mol percent based on the silica, having a relative viscosity, as measured at 5% $SiO_2$, of from 1.1 to 1.5, and being stabilized with enough sodium hydroxide to give an $SiO_2:Na_2O$ mol ratio of from 300D:1 to 50D:1, where D is the average particle diameter in millimicrons.

10. In a process for producing a stable silica organosol characterized by showing substantially no increase in relative viscosity when stored at 30° C. for one month, the steps comprising adding to a deionized aquasol of amorphous, dense, substantially non-aggregated silica spheroids 5 to 130 millimicrons in diameter, the sol having a salt content as measured by conductivity and expressed as $Na_2SO_4$ of less than 0.2 mol percent based on the silica, an alkali of the class consisting of water-soluble monovalent metal silicates and basic hydroxides of monovalent cations, in an amount sufficient to give an $SiO_2:M_2O$ ratio of from 20D:1 to 300D:1, where D is the average particle diameter in millimicrons and $M_2O$ is the alkali expressed as the equivalent basic oxide, mixing the so-treated aquasol with from three to six times its volume of a water-miscible, alkoxy-substituted ethanol to make an aqua-organosol, and distilling water from said aqua-organosol until the liquid remaining consists essentially of said alkoxy-substituted ethanol.

11. In a process for producing a stable silica organosol characterized by showing substantially no increase in relative viscosity when stored at 30° C. for one month, the steps comprising adding to a deionized aquasol of amorphous, dense, substantially non-aggregated silica spheroids 5 to 130 millimicrons in diameter, the sol having a salt content as measured by conductivity and expressed as $Na_2SO_4$ of less than 0.2 mol percent based on the silica, an alkali of the class consisting of water-soluble monovalent metal silicates and basic hydroxides of monovalent cations, in an amount sufficient to give an $SiO_2:M_2O$ ratio of from 20D:1 to 300D:1, where D is the average particle diameter in millimicrons and $M_2O$ is the alkali expressed as the equivalent basic oxide, mixing the so-treated aquasol with from three to six times its volume of a water-miscible, alkoxy-substituted ethanol to make an aqua-organosol, and distilling water from said aqua-organosol until it is substantially anhydrous.

12. In a process for producing a stable silica organosol characterized by showing substantially no increase in relative viscosity when stored at 30° C. for one month, the steps comprising adding to a deionized aquasol of amorphous, dense, substantially non-aggregated silica spheroids 5 to 130 millimicrons in diameter, the sol having a salt content as measured by conductivity and expressed as $Na_2SO_4$ of less than 0.2 mol percent based on the silica, a alkali of the class consisting of water-soluble monovalent metal silicates and basic hydroxides of monovalent cations, in an amount sufficient to give an $SiO_2:M_2O$ ratio of from 20D:1 to 300D:1, where D is the average particle diameter in millimicrons and $M_2O$ is the alkali expressed as the equivalent basic oxide, mixing the so-treated aquasol with from three to six times its volume of a water-miscible, alkoxy-substituted ethanol to make an aqua-organosol, and distilling water and alkoxy-substituted ethanol from said aqua-organosol until it is substantially anhydrous and its silica content is at least 26%.

13. In a process for producing a stable silica organosol characterized by showing substantially no increase in relative viscosity when stored at 30° C. for one month, the steps comprising adding to a deionized aquasol of amorphous, dense, substantially non-aggregated silica spheroids 5 to 130 millimicrons in diameter, the sol having a salt content as measured by conductivity and expressed as $Na_2SO_4$ of less than 0.2 mol percent based on the silica, an alkali of the class consisting of water-soluble monovalent metal silicates and basic hydroxides of monovalent cations, in an amount sufficient to give an $SiO_2:M_2O$ ratio of from 300D:1 to 50D:1, where D is the average particle diameter in millimicrons and $M_2O$ is the alkali expressed as the equivalent basic oxide, mixing the so-treated aquasol with from three to six times its volume of a water-miscible, alkoxy-substituted ethanol to make an aqua-organosol, and distilling water from said aqua-organosol until the liquid remaining consists essentially of said alkoxy-substituted ethanol.

14. In a process for producing a stable silica organosol characterized by showing substantially no increase in relative viscosity when stored at 30° C. for one month, the steps comprising adding to a deionized aquasol of amorphous, dense, substantially non-aggregated silica spheroids 10 to 50 millimicrons in diameter, the sol having a salt content as measured by conductivity and expressed as $Na_2SO_4$ of less than 0.2 mol percent based on the silica, an alkali of the classs consisting of water-soluble monovalent metal silicates and basic hydroxides of monovalent cations, in an amount sufficient to give an $SiO_2:M_2O$ ratio of from 20D:1 to 300D:1, where D is the average particle diameter in millimicrons and $M_2O$ is the alkali expressed as the equivalent basic oxide, mixing the so-treated aquasol with from three to six times its volume of a water-micible, alkoxy-substituted ethanol to make an aqua-organosol, and distilling water from said aqua-organosol until the liquid remaining consists essentially of said alkoxy-substituted ethanol.

15. In a process for producing a stable silica organosol characterized by showing substantially no increase in relative viscosity when stored at 30° C. for one month, the steps comprising adding to a deionized aquasol of amorphous, dense, substantially non-aggregated silica spheroids 10 to 50 millimicrons in diameter, the sol having a salt content as measured by conductivity and expressed as $Na_2SO_4$ of less than 0.2 mol percent based on the silica, an alkali of the class consisting of water-soluble monovalent metal silicates and basic hydroxides of monovalent cations, in an amount sufficient to give an $SiO_2:M_2O$ ratio in the range of 300D:1 to 50D:1, where D is the average particle diameter in millimicrons and $M_2O$ is the alkali expressed as the equivalent basic oxide, mixing the so-treated aquasol with from three to six times its volume of a water-miscible, alkoxy-substituted ethanol to make an aqua-organosol, and distilling water from said aqua-organosol until the liquid remaining consists essentially of said alkoxy-substituted ethanol.

16. In a process for producing a stable silica organosol characterized by showing substantially no increase in relative viscosity when stored at 30° C. for one month, the steps comprising adding to a deionized aquasol of amorphous, dense, substantially non-aggregated silica spheroids 5 to 130 millimicrons in diameter, the sol having a salt content as measured by conductivity and expressed as $Na_2SO_4$ of less than 0.2 mol percent based on the silica, an alkali of the class consisting of water-soluble monovalent metal silicates and basic hydroxides of monovalent cations, in an amount sufficient to give an $SiO_2:M_2O$ ratio of from 20D:1 to 300D:1, where D is the average particle diameter in millimicrons and $M_2O$ is the alkali expressed as the equivalent basic oxide, mixing the so-treated aquasol with from three to six times its volume of a water-miscible, alkoxy-substituted ethanol to make an aqua-organosol, and distilling water from said aqua-organosol until the water content is below about 0.1 percent and heating the mixture, whereby the silica spheroids in the substituted ethanol are surface-esterified to the extent of from 1.0 to 3.2 ester groups per square millimicron of silica surface.

17. In a process for producing a stable silica organosol characterized by showing substantially no increase in relative viscosity when stored at 30° C. for one month, the steps comprising adding to a deionized aquasol of amorphous, dense, substantially non-aggregated silica spheroids 10 to 50 millimicrons in diameter, the sol having a salt content as measured by conductivity and expressed as $NA_2SO_4$ of less than 0.2 mol percent based on the silica, an alkali of the class consisting of water-soluble monovalent metal silicates and basic hydroxides of monovalent cations, in an amount sufficient to give an $SiO_2:M_2O$ ratio in the range of 300D:1 to 50D:1, where D is the average particle diameter in millimicrons and $M_2O$ is the alkali expressed as the equivalent basic oxide, mixing the so-treated aquasol with from three to six times its volume of a water-miscible, alkoxy-substituted ethanol to make an aqua-organosol, and distilling water from said aqua-organosol until the water content is below about 0.1 percent, heating the mixture until the silica spheroids in the substituted ethanol are surface-esterified to the extent of from 1.5 to 3.2 ester groups per square millimicron of silica surface, and evaporating off substituted ethanol until the silica content of the product is at least 26% as $SiO_2$, by weight.

18. In a process for producing a stable silica organosol characterized by showing substantially no increase in relative viscosity when stored at 30° C. for one month, the steps comprising adding to a deionized aquasol of amorphous, dense, substantially non-aggregated silica spheroids 10 to 50 millimicrons in diameter, the sol having a salt content as measured by conductivity and expressed as $Na_2SO_4$ of less than 0.2 mol percent based on the silica, an alkali of the class consisting of water-soluble monovalent metal silicates and basic hydroxides of monovalent cations, in an amount sufficient to give an $SiO_2:M_2O$ ratio in the range of 300D:1 to 50D:1, where D is the average particle diameter in millimicrons and $M_2O$ is the alkali expressed as the equivalent basic oxide, mixing the so-treated aquasol with from three to six times its volume of a water-miscible, alkoxy-substituted ethanol to make an aqua-organosol, and distilling water from said aqua-organosol until the water content is below about 0.1 percent, heating the mixture until the silica spheroids in the substituted ethanol are surface-esterified to the extent of from 1.0 to 1.5 ester groups per square millimicron of silica surface, and evaporating off substituted ethanol until the silica content of the product is at least 26% as $SiO_2$, by weight.

References Cited in the file of this patent

UNITED STATES PATENTS

| | | |
|---|---|---|
| 1,922,006 | Von Hoessle | Aug. 8, 1933 |
| 2,395,880 | Kirk | Mar. 5, 1946 |
| 2,408,656 | Kirk | Oct. 1, 1946 |
| 2,574,902 | Bechtold et al. | Nov. 13, 1951 |
| 2,680,721 | Broge et al. | June 8, 1954 |
| 2,739,074 | Iler | Mar. 20, 1956 |

FOREIGN PATENTS

| | | |
|---|---|---|
| 611,914 | Great Britain | Nov. 5, 1948 |
| 654,850 | Great Britain | July 4, 1951 |